United States Patent Office

3,278,611
Patented Oct. 11, 1966

3,278,611
HYDROGENATION OF AROMATIC HALIDES
Kenneth C. Dewhirst, San Pablo, and Frederick F. Rust, Orinda, Calif., assignors to Shell Oil Company, New York, N.Y., a corporation of Delaware
No Drawing. Filed June 30, 1965, Ser. No. 468,564
11 Claims. (Cl. 260—631)

This application is a continuation-in-part of copending application U.S. Serial No. 252,623, filed January 21, 1963, now abandoned.

This invention relates to a process for the hydrogenation of halogen-containing aromatic compounds.

It is well known that the catalytic hydrogenation of unsaturated organic halogen-containing compounds results in extensive cleavage of the carbon-halogen bonds present within the molecule. In some cases, the extent of cleavage is so great that hydrogenolysis has been proposed as a method for the quantitative determination of the halogen present. Certain unsaturated aliphatic halides have been hydrogenated to the corresponding saturated halides under controlled conditions. For example, Baumann et al., U.S. Patent No. 2,118,662, issued May 24, 1938, discloses the vapor-phase hydrogenation of vinyl chloride under controlled conditions of flow and pressure in the presence of palladium or platinum catalysts. However, general methods for the hydrogenation of aromatic halides wherein halogen hydrogenolysis has been minimized have not been available.

It is an object of the present invention to provide an improved process for the catalytic hydrogenation of aromatic halides. More particularly, it is an object to provide an improved process for the hydrogenation of aromatic halides to cycloalkyl halides under conditions whereby the extent of halogen hydrogenolysis is comparatively low.

It has now been found that these objects are accomplished by contacting an aromatic halide with molecular hydrogen in the liquid phase in the presence of a catalytic amount of rhodium. The process of the invention serves to effect reduction of the aromatic halide nucleus to produce a cycloalkyl halide. For example, chlorobenzene is hydrogenated according to the process of the invention to produce cyclohexyl chloride. In spite of the vigorous conditions known to be necessary for hydrogenation of aromatic rings, a comparatively high level of halogen retention is observed.

The aromatic halide employed as reactant comprises at least one six-membered carbocyclic aromatic ring having at least one halogen substituent attached directly to a ring carbon atom thereof. Although the process is broadly applicable to the hydrogenation of aromatic halides of relatively simple or alternatively of quite complex structure, best results are obtained when the aromatic halide has up to 35 carbon atoms and up to 6 halogen substituents. Preferred aromatic halides have up to 24 carbon atoms and from 1 to 2 aromatic rings, that is, the aromatic halide is mono- to di-nuclear, which rings are fused, are connected directly by a bond between ring carbon atoms or are connected by means of other atoms, e.g., an ether linkage or an alkylene bridge having up to 12 carbon atoms. The aromatic halide preferably contains up to 4 halogen substituents each of which is attached to a carbon atom of an aromatic ring, and the aromatic halide has only aromatic carbon-carbon unsaturation, i.e., is free from aliphatic carbon-carbon unsaturation. Although the process is broadly applicable to aromatic halides wherein the halogen substituent(s) is (are) fluorine or iodine, preferred reactants are those wherein each halogen is halogen of atomic number from 17 to 35 inclusive, that is, the middle halogens bromine and chlorine, particularly chlorine. Considered as a whole, the aromatic halide is a hydrocarbyl halide of only atoms of carbon and hydrogen besides the halogen atom(s) present, or is a substituted-hydrocarbyl halide containing additional atoms, particularly oxygen atoms, which are incorporated in up to 4 functional groups such as hydroxyl, oxy, carboxy, alkoxy, carboalkoxy and hydrocarbonyloxy groups, which groups are preferably substituted on carbon atoms forming a portion of an aromatic ring.

Illustrative aromatic halides include mononuclear aromatic halides such as chlorobenzene, bromobenzene, p-bromotoluene, 1-chloro-2,4-diethyl benzene, m-dichlorobenzene, 1,2,4-tribromobenzene, o-chlorophenol, methyl p-chlorobenzoate, m-bromoacetylbenzene, m-chlorophenol, p-chlorobenzoic acid and 3,5-dichloroanisole; as well as dinuclear aromatic halides such as 1-chloronapthalene, 2-bromonaphthalene, 1,4,5-trichloro-8-methylnaphthalene, bis(4 - chlorophenyl)ether, 1,1 - bis(4 - bromophenyl)ethane, 2,2 - bis(3-chloro-4-hydroxyphenyl)propane, 3,3'-dichlorobiphenyl, 4-chloro-4'-bromobiphenyl, 3,3',5 - trichloro - 5' - hydroxybiphenyl and 2,2-bis(3,5-dichloro-4-hydroxyphenyl)propane.

In general, utilization of hydrocarbon aromatic halides is preferred over the use of substituted-hydrocarbon halides, although the class of aromatic halides incorporating up to 2 hydroxyl substituents in an otherwise hydrocarbon aromatic halide structure comprises a particularly preferred class of aromatic reactants.

In the process of the invention, the aromatic halide is contacted with molecular hydrogen in the presence of a metallic rhodium catalyst which is employed as a finely divided metal or in conjunction with a suitable inert support such as silica, alumina, carbon, crushed brick or the like. In the preferred modification wherein a supported catalyst is employed, catalyst compositions of from about 0.5% by weight to about 15% by weight of rhodium are satisfactory. Catalyst compositions comprising rhodium supported on carbon or alumina are particularly satisfactory and, in part because of the commercial availability thereof, compositions of from about 3% by weight to about 10% by weight of rhodium-on-carbon are particularly preferred. In the hydrogenation zone, only catalytic quantities of rhodium are required. Although no detriment appears to arise from the use of large amounts of rhodium, e.g., more than about 15% by weight based on the aromatic halide, there is little or no practical advantage to be gained thereby as the process requires only catalytic quantities. Alternatively, the use of amounts of rhodium less than about 0.0005% by weight based on the aromatic halide is generally unsatisfactory, due to the inevitable physical loss of catalyst during the reaction and recovery processes. In general, amounts of rhodium from about 0.001% by weight to about 5% by weight based on the aromatic halide are preferred.

The process of the invention is conducted in the liquid phase in the presence of or alternatively in the substantial absence of inert reaction solvent. In the modification where reaction solvent is employed, reaction solvents which are liquid under the conditions of the reaction and are inert towards the reactants and the products produced therefrom are satisfactory. Illustrative solvents include alcohols such as methanol, isopropanol, tert-butanol and ethylene glycol as well as ether alcohols, e.g., the Cellosolves and the Carbitols; lower alkanoic acids such as acetic acid and propionic acid; ethers including diethyl ether, dibutyl ether, methyl hexyl ether, tetrahydrofuran, dioxane, dimethoxyethane and diethylene glycol dimethyl ether; and saturated aliphatic hydrocarbons such as hexane, isooctane, cyclohexane and decalin. From practical considerations of recovery and handling, it is preferred to effect hydrogenation in the substantial absence of reaction solvent whenever the physical characteristics of the aromatic halide, particularly the melting point, will allow.

The hydrogenation process is conducted under relatively mild conditions of temperature and pressure. The reaction is suitably conducted at temperatures of from about 10° C. to about 90° C., although reaction temperatures of from about 10° C. to about 45° C. are preferred and in many instances good results are obtained at ambient temperature. The process is conducted at pressures which are atmospheric, subatmospheric or superatmospheric, so long as the reaction mixture is maintained in the liquid phase. Pressures of from about 0.5 atmosphere to about 3000 atmospheres are generally suitable, although pressures of from about 1 atmosphere to about 100 atmospheres are preferred.

Hydrogenation is typically conducted by charging to a suitable reactor the catalyst, the aromatic halide and reaction solvent, if any, and pressurizing the reactor with hydrogen. Best results are obtained when the reaction mixture is agitated during reaction as by shaking, rocking or stirring, and the course of the hydrogenation is followed by observation of the decrease in hydrogen pressure within the reactor. In an alternate modification, the process is conducted in a continuous flow operation, e.g., by a "trickle" phase contacting of liquid substrate with gaseous or dissolved hydrogen while "trickling" through a bed of catalyst in particulate form. Subsequent to reaction, the product mixture is separated and the hydrogenated product recovered by conventional means, as by fractional distillation, selective extraction, crystallization and the like.

The products of the invention comprise cycloalkyl halides, e.g., cyclohexyl halides, of varying structure, depending of course on the structure of the aromatic halide reactant. Illustrative products include cyclohexyl chloride produced by hydrogenation of chlorobenzene, bis(4-chlorocyclohexyl) prepared from 4,4'-dichlorobiphenyl, 1-bromodecahydronapthhalene produced from 1-bromonaphthalene and 2,2-bis(3-chloro-4-hydroxycyclohexyl))propane produced from 2,2-bis(3-chloro-4-hydroxyphenyl)propane.

The cycloalkyl halide products find utility in a variety of applications, particularly as chemical intermediates. For example, reaction of the halogen substituent(s) with tertiary amine results in the formation of quaternary ammonium salts and reaction with alkali metal salts of alcohols or carboxylic acids produces useful ether or ester derivatives. Other conventional derivatives are similarly prepared in known manner.

To further illustrate the process of the invention, the following examples are provided. It should be understood that the details thereof are not to be regarded as limitations, as they may be varied as will be understood by one skilled in this art.

*Example I*

To a reactor was charged 10.8 g. of chlorobenzene and 1.0 g. of 5% rhodium-on-alumina. Hydrogenation was effected at ambient temperature and an initial hydrogen pressure of about 1000–1500 p.s.i.g over an 18 hour period, during which time the theoretical amount of hydrogen was absorbed. Gas-liquid chromatographic analysis of the product mixture indicated a 23% yield of cyclohexyl chloride.

*Example II*

To a reactor was charged 13.0 g. of o-dichlorobenzene in 6.5 g. hexane and 1.9 g. of 5% rhodium-on-carbon. The reactor was pressurized with hydrogen to an initial pressure of more than 2000 p.s.i.g and was maintained at ambient temperature for 6 hours. Gas-liquid chromatographic analysis of the product mixture indicated a 17% yield of 1,2-dichlorocyclohexane and a 23% yield of cyclohexyl chloride. The product mixture was then distilled to give 1,2-dichlorocyclohexane, B.P. 105° C. at 50 mm., for which the following elemental analysis was obtained.

|  | Anal. Calc. | Found |
|---|---|---|
| C, percent wt | 47.08 | 47.8 |
| H, percent wt | 6.59 | 6.6 |
| Cl, percent wt | 46.33 | 45.8 |

*Example III*

By a procedure similar to that of Example I, 9.9 g. of p-dichlorobenzene was hydrogenated in hexane solution at ambient temperature and high pressure in the presence of 2.1 g. of 5% rhodium-on-carbon. In 6 hours, 60% of the theoretical amount of hydrogen had been absorbed. Gas-liquid chromatographic analysis of the product mixture confirmed the presence of 1,4-dichlorocyclohexane.

Similar results are obtained when p-dibromobenzene is employed as the aromatic halide reactant.

*Example IV*

To an autoclave was charged 40 g. of o-chlorophenol, 143 ml. of isopropyl alcohol and 2 g. of 10% rhodium-on-carbon catalyst. Hydrogen was added to the reactor while the reaction mixture was heated to 70–75° C., the total pressure being 700 p.s.i.g Additional hydrogen was added periodically during a six-hour period to maintain the pressure at approximately 700 p.s.i.g The catalyst was removed by filtration and washed with isopropyl alcohol and the combined filtrate and washings were dried over magnesium sulfate. Subsequent to removal of the solvent by distillation, the product mixture was fractionally distilled to afford 4 fractions. A 23 g. fraction boiling at 90–94° C. was found by analysis to contain 9.6% chlorine by weight, of which 83% was chlorohydrin chlorine. These data indicated that 30.8% of this fraction was 2-chlorocyclohexanol. The presence of additional 2-chlorocyclohexanol in the distillation bottoms fraction was indicated by a similar analysis for chlorohydrin chlorine.

*Example V*

To a reactor was charged 55 g. of o-chlorophenol, 165 ml. of absolute ethanol and 2 g. of 10% rhodium-on-carbon catalyst. The reactor was pressurized to 500 p.s.i.g with hydrogen at ambient temperature and additional hydrogen was periodically added to replace that consumed. The reactor was maintained at 25–50° C., and at the end of 6.75 hours, 80% of the theoretical hydrogen had been consumed. The product mixture was filtered to remove the catalyst, flash distilled to remove solvent and the remainder was fractionally distilled in a spinning band distillation column. The 14.5 g. portion distilling at 30° C. at 2 mm. was refluxed with 1 N sodium hydroxide and the excess alkali titrated with 1.036 N hydrochloric acid. From the amount of sodium hydroxide that had reacted, it was determined that the portion contained 42% by weight chlorohydrin, i.e., 2-chlorocyclohexanol.

When 2,2-bis(3-chloro-4-hydroxyphenyl)propane is hydrogenated according to the above process, a good yield of 2,2-bis(3-chloro-4-hydroxycyclohexyl)propane is obtained.

We claim as our invention:

1. The process of hydrogenating aromatic halides by contacting an aromatic halide of up to 35 carbon atoms and up to 6 halogen substituents, each of which is a substituent of an aromatic ring carbon atom with molecular hydrogen, in the liquid phase in the presence of from about 0.0005% by weight to about 15% by weight based on aromatic halide of rhodium, at a temperature of from about 10° C. to about 90° C.

2. The process of hydrogenating aromatic halides by contacting a mono- to di-nuclear aromatic halide of up to 24 carbon atoms and up to 4 halogen atoms of atomic number from 17 to 35 inclusive, each of which is a substituent of an aromatic ring carbon atom, with molecular hydrogen, in the liquid phase in the presence of from about 0.0005% by weight to about 15% by weight based on aromatic halide of rhodium at a temperature of from about 10° C. to about 90° C. and a pressure of from about 0.5 atmosphere to about 3000 atmospheres.

3. The process of hydrogenating aromatic halides by contacting a mono- to di-nuclear aromatic halide free from aliphatic carbon-carbon unsaturation of up to 24 carbon atoms, up to 4 halogen atoms of atomic number from 17 to 35 each of which is a substituent of an aromatic ring carbon atom, and of only atoms of carbon, hydrogen, halogen and oxygen, said oxygen being present in up to 4 functional groups which are hydroxyl, oxy, alkoxy, carboxy, or carboalkoxy; with molecular hydrogen, in the liquid phase in the presence of from about 0.0005% by weight to about 15% by weight based on aromatic halide of rhodium at a temperature of from about 10° C. to about 90° C. and a pressure of from about 0.5 atmosphere to about 3000 atmospheres.

4. The process of claim 3 wherein the aromatic halide is chlorophenol.

5. The process of claim 3 wherein the aromatic halide is 2,2-bis(3-chloro-4-hydroxyphenyl)propane.

6. The process of hydrogenating aromatic halides by contacting a mono- to di-nuclear aromatic halide free from aliphatic unsaturation of up to 24 carbon atoms, up to 4 halogen atoms of atomic number from 17 to 35 inclusive each of which is a substituent on an aromatic ring carbon atom; with molecular hydrogen, in the liquid phase in the presence of from about 0.001% by weight to about 5% by weight based on aromatic halide of rhodium, at a temperature of from about 10° C. to about 45° C. and a pressure of from about 1 atmosphere to about 100 atmospheres.

7. The process of hydrogenating aromatic halides by contacting mono- to di-nuclear hydrocarbon aromatic halide of up to 24 carbon atoms and up to 4 halogen atoms of atomic number from 17 to 35 inclusive each of which is a substituent on an aromatic ring carbon atom; with molecular hydrogen, in the liquid phase in the presence of from about 0.001% by weight to about 5% by weight based on the aromatic halide of rhodium, at a temperature of from about 10° C. to about 45° C. and a pressure of from about 1 atmosphere to about 100 atmospheres.

8. The process of claim 7 wherein the aromatic halide is chlorobenzene.

9. The process of claim 7 wherein the aromatic halide is dihalobenzene.

10. The process of claim 9 wherein the dihalobenzene is dichlorobenzene.

11. The process of claim 10 wherein the dichlorobenzene is o-dichlorobenzene.

References Cited by the Examiner

UNITED STATES PATENTS

| | | | |
|---|---|---|---|
| 2,675,390 | 4/1954 | Rosenblatt | 260—631 X |
| 3,179,705 | 4/1965 | Coker et al. | 260—648 |

LEON ZITVER, *Primary Examiner.*

DANIEL D. HORWITZ, *Examiner.*

T. G. DILLAHUNTY, *Assistant Examiner.*